United States Patent
Dieckmann et al.

(10) Patent No.: US 10,717,478 B2
(45) Date of Patent: Jul. 21, 2020

(54) REAR SPOILER DEVICE FOR A VEHICLE, IN PARTICULAR LORRY

(71) Applicant: WABCO Europe BVBA, Brussels (BE)

(72) Inventors: Thomas Dieckmann, Pattensen (DE); Jakob Tobias Krost, Braunschweig (DE); Josef Oleksik, Braunschweig (DE); Timo Richter, Braunschweig (DE); Gandert Marcel Rita Van Raemdonck, Delft (NL)

(73) Assignee: WABCO EUROPE BVBA, Brussels (BE)

( * ) Notice: Subject to any disclaimer, the term of this patent is extended or adjusted under 35 U.S.C. 154(b) by 0 days.

(21) Appl. No.: 16/092,772

(22) PCT Filed: Jun. 23, 2017

(86) PCT No.: PCT/EP2017/000732
§ 371 (c)(1),
(2) Date: Oct. 11, 2018

(87) PCT Pub. No.: WO2018/006992
PCT Pub. Date: Jan. 11, 2018

(65) Prior Publication Data
US 2019/0118870 A1    Apr. 25, 2019

(30) Foreign Application Priority Data

Jul. 6, 2016 (DE) .................. 10 2016 008 213

(51) Int. Cl.
*B62D 35/00* (2006.01)
(52) U.S. Cl.
CPC ......... *B62D 35/001* (2013.01); *B62D 35/007* (2013.01)

(58) Field of Classification Search
CPC ... B62D 35/001; B62D 35/002; B62D 35/007
See application file for complete search history.

(56) References Cited

U.S. PATENT DOCUMENTS

| 4,214,787 A | 7/1980 | Chain |
| 8,973,972 B2 * | 3/2015 | Dieckmann .......... B62D 35/007 296/180.4 |

(Continued)

FOREIGN PATENT DOCUMENTS

| DE | 10228658 A1 | 1/2004 |
| DE | 202009015009 U1 | 1/2010 |

(Continued)

OTHER PUBLICATIONS

Computer generated translation of DE 102008036888 (Year: 2010).*

*Primary Examiner* — Gregory A Blankenship
(74) *Attorney, Agent, or Firm* — Leydig, Voit & Mayer, Ltd.

(57) ABSTRACT

A rear spoiler device for a vehicle having at least one rear door includes an air guide element and an adjustment device configured to adjust the air guide element between a retracted base position that allows the rear door to be opened and an extended travel position configured to extend contours and guide air aerodynamically. The adjustment device is mounted in an articulated fashion on both a door-side joint and on a spoiler-side joint. The adjustment device has an intermediate joint provided between the door-side joint and the spoiler-side joint. An adjustment of the adjustment device from the base position to the travel position changes an intermediate joint angle formed at the intermediate joint.

20 Claims, 2 Drawing Sheets

(56) References Cited

U.S. PATENT DOCUMENTS

| | | | |
|---|---|---|---|
| 9,708,015 B2* | 7/2017 | Dieckmann | B62D 35/001 |
| 9,950,752 B2* | 4/2018 | Baker | B62D 35/001 |
| 9,971,356 B2* | 5/2018 | Smith | B62D 35/004 |
| 2012/0223544 A1 | 9/2012 | Benton | |
| 2014/0132031 A1* | 5/2014 | Dieckmann | B62D 35/001 |
| | | | 296/180.5 |
| 2014/0339854 A1* | 11/2014 | Tuerk | B62D 35/001 |
| | | | 296/180.4 |
| 2016/0068200 A1* | 3/2016 | Dieckmann | B62D 35/001 |
| | | | 296/180.4 |
| 2016/0185401 A1* | 6/2016 | Breidenbach | B62D 35/001 |
| | | | 296/180.4 |
| 2018/0043943 A1* | 2/2018 | Polidori | B62D 35/001 |
| 2019/0118870 A1* | 4/2019 | Dieckmann | B62D 35/001 |
| 2019/0315203 A1* | 10/2019 | Schuh | B60J 5/108 |

FOREIGN PATENT DOCUMENTS

| | | | | |
|---|---|---|---|---|
| DE | 102008036888 | * | 2/2010 | B62D 35/00 |
| DE | 102008036888 A1 | | 2/2010 | |
| DE | 202009014476 U1 | | 2/2010 | |
| DE | 102011107366 A1 | | 1/2013 | |
| DE | 102013006376 A1 | | 10/2014 | |
| DE | 102013008910 A1 | | 11/2014 | |

* cited by examiner

REAR SPOILER DEVICE FOR A VEHICLE, IN PARTICULAR LORRY

CROSS REFERENCE TO RELATED APPLICATIONS

This application is a U.S. National Stage Application under 35 U.S.C. § 371 of International Application No. PCT/EP2017/000732 filed on Jun. 23, 2017, and claims benefit to German Patent Application No. DE 10 2016 008 213.5 filed on Jul. 6, 2016. The International Application was published in German on Jan. 11, 2018, as WO 2018/006992 A1 under PCT Article 21(2).

FIELD

The invention concerns a rear spoiler device for a vehicle, in particular a lorry.

BACKGROUND

Rear spoilers serve to improve the aerodynamics of a vehicle, in particular a vehicle with a box-shaped structure and a blunt end, e.g. a lorry, and can reduce the fuel consumption accordingly. They are arranged in the rear part of the vehicle and generally comprise air guide elements which extend the contours of the vehicle towards the rear, e.g. with curved, straight or flat faces running towards the rear and towards the middle. Such rear spoilers may be attached for example on the roof or on the side walls of the truck.

DE 20 2009 014 476 U1 and DE 20 2009 015 009 U1 disclose rear spoiler structures in which the air guide elements or spoiler elements are arranged movably or pivotably in order to allow unobstructed opening of the doors.

Pivotable or foldable rear spoilers are generally attached to the rear door hinges. DE 102 28 658 A1 discloses various solutions in which aerodynamic optimization is achievable via surfaces which can pivot via a hinge in the travel region.

Here, the connection of the air guide elements in the hinge region of the rear doors in principle causes a problem since the stowage area available in the hinge region is only small; this avoids obstructing the complete opening of the doors and the pivoting of the rear doors through around 270° towards the front so as to rest against the sides of the vehicle. In order to connect the air guide elements in the hinge region of the door, more complex systems are therefore known. DE 10 2008 036 888 A1 discloses embodiments of the rear spoilers and attachments to the vehicle in which it is provided, amongst others, to arrange a carrier between the rear door and the air guide element which can be extended to allow the door to swing wide open. When the rear door is swung outward about its vertical pivot axis, the air guide element is thus initially also swung out until it reaches the outer faces and the side wall. On further opening of the rear door, the flexible carrier element is compressed accordingly.

Such systems are generally very costly, e.g. with complex hinge or joint structures. Often, deformations of the air guide elements or further parts are required, thus necessitating correspondingly elastic, stretchable materials which in some cases are not weather-resistant. Also, often only the use of relatively short air guide elements is possible, which limits the improvement in the aerodynamics.

SUMMARY

In an embodiment, the present invention provides a rear spoiler device for a vehicle having at least one rear door. The rear spoiler device includes an air guide element and an adjustment device configured to adjust the air guide element between a retracted base position that allows the rear door to be opened and an extended travel position configured to extend contours and guide air aerodynamically. The adjustment device is mounted in an articulated fashion on both a door-side joint and on a spoiler-side joint. The adjustment device has an intermediate joint provided between the door-side joint and the spoiler-side joint. An adjustment of the adjustment device from the base position to the travel position changes an intermediate joint angle formed at the intermediate joint.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
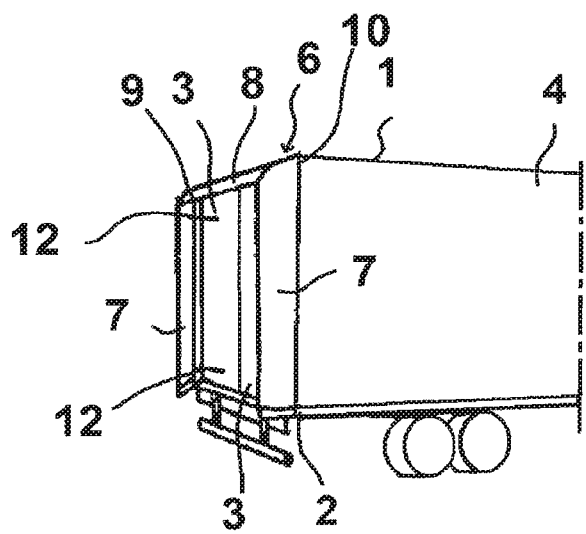
FIG. 1 shows a perspective view of a rear area of a lorry with a rear spoiler device according to an embodiment of the invention.

Embodiments of the invention provide rear spoiler devices which can be formed with relatively little cost and that allow a secure, simple adjustment between a travel position and a base position.

Embodiments of the invention further provide vehicles, in particular lorries, that have rear spoiler devices arranged in a rear area.

Rear spoiler devices according to embodiments of the invention include an air guide element, e.g. a side air guide element and/or roof air guide element, which is mounted in articulated fashion on the rear doors and can be adjusted from a retracted base position into the extended travel position. For this, an adjustment device is provided which is arranged in articulated fashion between a door-side joint, provided in particular on the outside of the rear doors, and a spoiler-side joint, provided in particular on the inner face of the air guide element, and which allows an adjustment in length.

At least one, preferably precisely one, intermediate joint which serves for collapse is provided between the door-side joint and spoiler-side joint. The term "collapse of the intermediate joint" in particular means compression or reduction of the intermediate joint angle formed at the intermediate joint, i.e. from an elongated configuration to a folded configuration.

In the retracted base position, the adjustment device is preferably elongated with an large intermediate joint angle, which however is (slightly) less than 180°, so that the intermediate joint preferably lies outside the connecting line between the door-side joint and the front-side joint. The intermediate joint in particular lies slightly behind this connecting line, so that on subsequent extension of the adjustment device, the intermediate joint is pressed further back and thereby collapsed.

Thus already, an effective lever arm of the adjustment device, with which the adjustment device acts on the air guide element and adjusts this relative to its door-side connection or the door-side spoiler joint, is enlarged.

Advantageously, on extension, the folding adjustment device moves as far as the air guide element, e.g. with the intermediate joint or an intermediate member formed between the intermediate joint and the door-side joint. Thus an adjustable triangle is formed by the door-side joint, the spoiler-side joint and the intermediate joint. The length adjustment device in particular acts between the door-side joint and the intermediate member, so that it can be controlled and an auxiliary force applied from the rear door or vehicle structure.

An effective and secure contact is achieved in particular in a recess of the air guide element, so that the intermediate member extends back slightly through the recess. For this, a cover e.g. a flexible cover may be provided which covers the recess with the intermediate joint which is exposed towards the outside.

Embodiments of the invention, allow for certain advantages to be achieved. The rear spoiler devices according to embodiments of the invention with the adjustment device allow a continuous adjustment movement, in which the effective lever arm is firstly set on extension in a first adjustment travel, in particular by collapse of the intermediate member, up to additional contact on the spoiler, whereupon in a second adjustment travel, the actual adjustment of the spoiler takes place with the large lever arm; these adjustment ranges preferably transform into each other without an intermediate stoppage, and may in principle also overlap with each other.

The adjustment devices allow secure holding or locking in both positions with no additional fixings or locking means.

Adjustment is possible by means of an auxiliary force, e.g. a fluid-activated cylinder or electric drive which drives the length adjustment device. The length adjustment device actuated by auxiliary force may be dimensioned relatively small, since due to the enlargement of the lever arm it can act with a high reduction ratio or large effective lever arm. Thus secure adjustments are possible with little force and small apparatus, e.g. with a compact cylinder.

In this way, adjustment is also possible without the manual intervention of the user, e.g. during travel, for example by activation from the driver's cab or also automatically depending on speed.

Since the adjustment devices are compact, they can be received in a flat orientation between the air guide element and the rear door, and hence in this base position allows the rear door to open and fold through 270° towards the front so as to rest on the side face, while the rear spoiler device is received between the side door and the rear door.

The rear spoiler device may be received preferably completely on the rear door, i.e. without fixing to the vehicle structure.

In addition or alternatively to a side air guide element, a corresponding roof air guide element may also be provided.

A further advantage is that in principle, there is no restriction on the length of the element; therefore good aerodynamic qualities can be achieved with sufficiently long air guide elements.

A particular advantage is that such adjustment devices and air guide elements have no adverse effect on the problematical stowage area in the region of the door hinge. The door hinge may act freely and allow movement of the rear door. The rear spoiler device may be attached on the outside of the rear door, and is mounted compactly in the hinge region of the rear door, e.g. with only one spoiler joint attaching the air guide element to the rear door. The additional adjustment device and further elements are then provided away from the hinge region, further towards the middle of the vehicle.

A lorry 1 shown in FIG. 1 has, in the conventional fashion, a rear area 2 with two outwardly pivotable rear doors 3, side faces 4 and a roof surface 5, so that the lorry 1 is formed substantially box-shaped at least in its rear area 2, with a blunt end which initially leads to unfavorable aerodynamic properties. Therefore a rear spoiler device 6 with two side spoilers 7 and two roof air guide elements 8 is provided, wherein a side air guide element 7 and a roof air guide element 8 are provided on each rear door 3. The rear doors 3 are each pivoted at rear door hinges 9 on a vehicle structure 10 or the side faces 4. The side air guide elements 7 and roof air guide elements 8 are advantageously made from plastic panels or rigid plastic surfaces, and may be flat and level or rectilinear, but also e.g. slightly curved towards the rear.

The rear spoiler device 6 may advantageously be attached exclusively on the rear door 3, so that a side spoiler 7 and roof spoiler 8 are attached to each rear door 3.

The rear spoiler device 6 may be adjusted between the extended travel position shown in FIG. 1, in which the side air guide elements 9 run obliquely towards the rear and towards the inside (travel position), and a base position in which they lie close to the rear doors 3; in this way, in the base position with the side air guide elements 7 and preferably also the roof air guide elements 8 lying thereon, the rear doors 3 can first be swung outward and then pivoted forward through 270° so that the rear doors 3 lie e.g. against the side faces 4 and can be fixed thereto; in each case, a side air guide element 7 and a roof air guide element 8 are received between the rear door 3 and side face 4.

The adjustment between the travel position and the base position is automated and performed by an adjustment device 12 which can control the side air guide elements 7 and roof air guide elements 8 together or separately. The adjustment of the side air guide elements 7 is described below, wherein the adjustment of the roof air guide elements 8 may take place accordingly.

The adjustment device 12 has a cylinder e.g. a pneumatic cylinder 14 which is attached in a cylinder joint 15 on the outside of the rear doors 3, wherein the cylinder joint 15 is advantageously spaced slightly from the door face towards the rear, for example by a bearing block 15a or a similar spacer. The pneumatic cylinder 14 extends a piston rod 16, at the end of which an intermediate joint 17 is arranged which is connected to a spoiler-side joint 18 by a intermediate member 19. Thus the pneumatic cylinder 14 and the piston rod 16 form a length adjustment device 14, 16 for adjusting the distance between the joints 15 and 17. The intermediate member 19 is thus pivoted at both its ends on the joints 17 and 18, wherein the spoiler-side joint 18 is arranged on the inside 7a of the side air guide element 7 and is correspondingly moved slightly away from the inside. The length adjustment device 14, 16 with the joints 15, 17, the intermediate member 19 and the spoiler-side joint 18, thus form the adjustment device 12.

At its front end 7*c* in the direction of travel, the side air guide element 7 is attached to the rear door 3 in an adjustment joint 20, e.g. approximately in the axis of the rear door hinge 9, preferably offset slightly inwardly relative to the rear door hinge 9, so that the adjustment joint 20 is mounted on the rear door 3.

Figure 5:
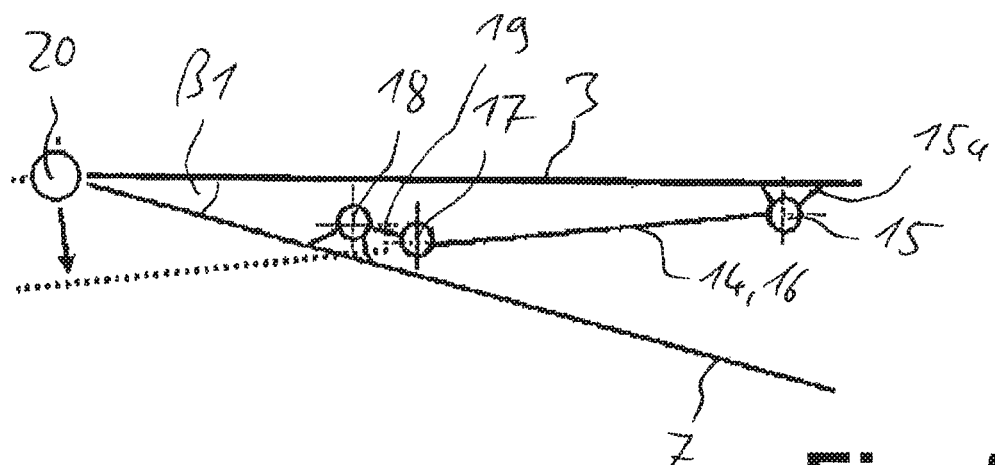
FIG. 5 shows a diagrammatic view corresponding to FIG. 2 with the side spoiler in the retracted base position.
Figure 6:
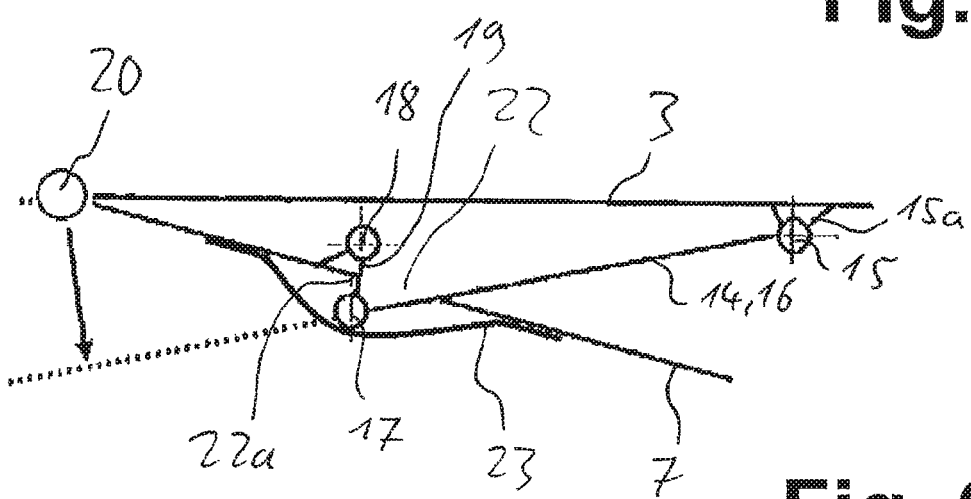
FIG. 6 shows the partially extended position corresponding to FIG. 3, in a diagrammatic depiction.
Figure 2:
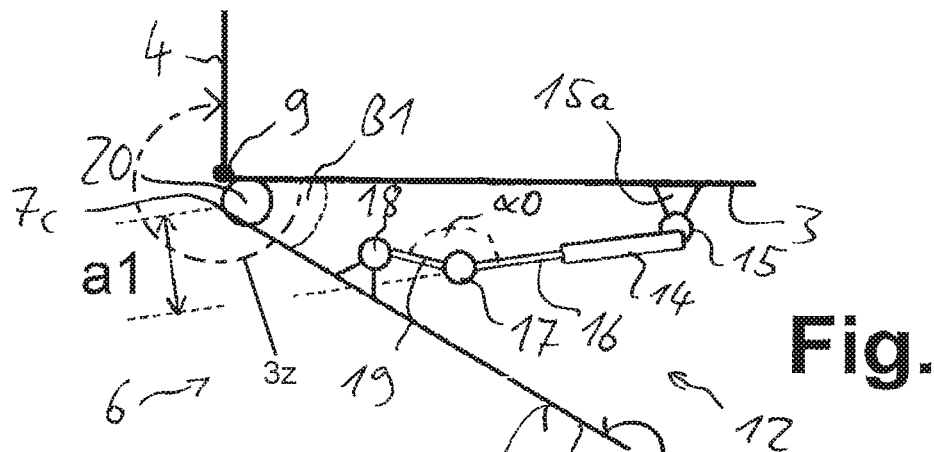
FIG. 2 shows a top view of the left rear area of the lorry with the side spoiler in a retracted position.
Figure 3:
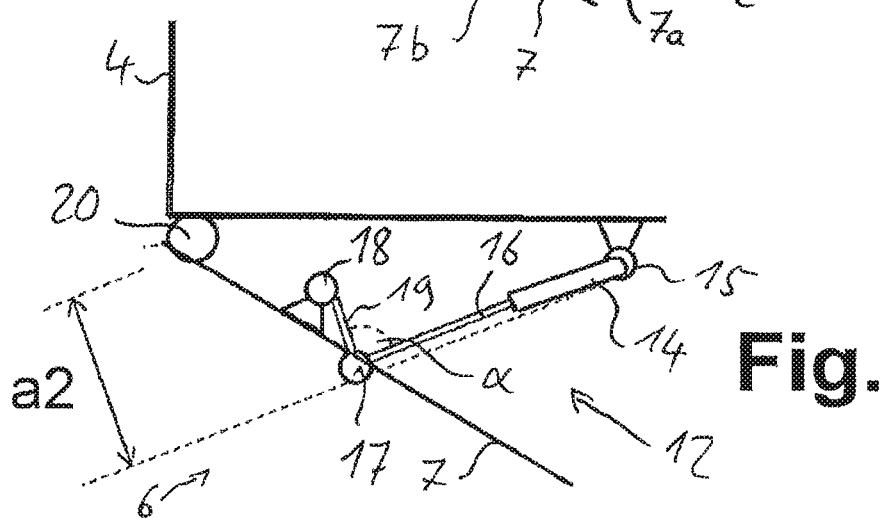
FIG. 3 shows a view corresponding to FIG. 2 with the side spoiler in the partially extended position.
Figure 4:
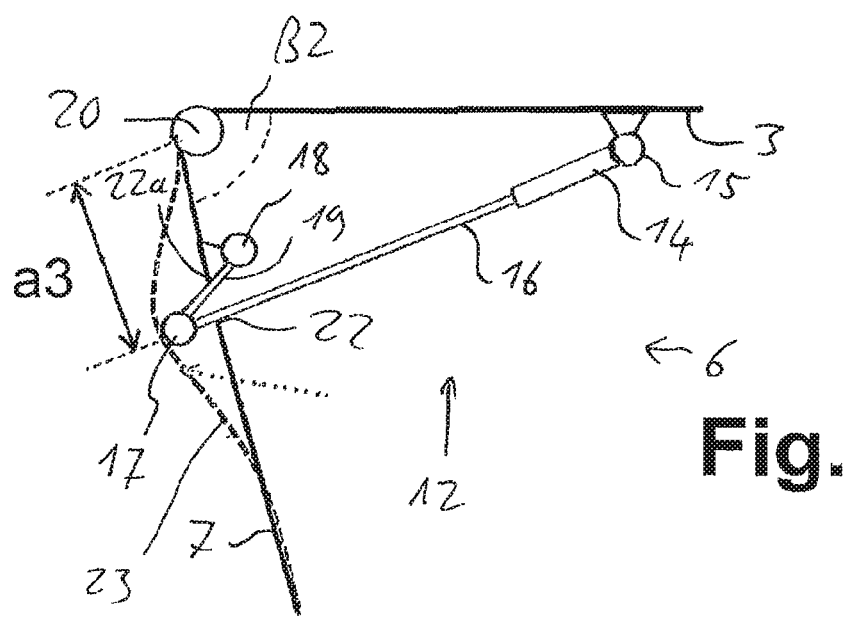
FIG. 4 shows a view corresponding to FIGS. 2 and 3 with the side spoiler in the extended position.

Thus by actuation of the adjustment device, i.e. application of compressed air to the pneumatic cylinder 14, the side air guide element 7 can be pivoted; in the retracted position of the piston rod 16, the side air guide element 7 lies close to the rear door 3, wherein for the sake of clarity, the depiction in FIGS. 2 to 4 does not completely reproduce the transverse extent of the rear doors 3, and hence in the base position of FIG. 2, the side air guide element 7 is flatter, i.e. lies on the rear door 3 with a smaller contact angle β1. The diagrammatic depictions of FIGS. 4 and 5 show that the side air guide element 7 may lie relatively closely against the rear door 3, i.e. with a small contact angle β1. When the piston rod 16 extends, the side air guide element is therefore pivoted away from the rear door 3 and positioned obliquely, so that it runs towards the rear and downward from its front end 7*c* to its rear end 7*d*, and assumes a travel position angle β2 of e.g. between 70 and less than 90° relative to the rear door 3.

With the cylinder joint 15, the length adjustment device 14, 16, the intermediate joint 17, the intermediate member 19 and the inner bearing member 18, the adjustment device 12 forms a three-pivot structure or adjustable triangle; in the intermediate joint 17, an intermediate joint angle α is formed which, in the retracted base position of FIG. 2, forms an obtuse angle to the rear door 3 or towards the front, i.e. with the starting value α0 which is slightly smaller than 180° (90°<α0<180° and is then reduced as the intermediate joint 17 collapses further.

As FIG. 3 shows, a recess 22 is formed in the side air guide element 7 and receives the intermediate joint 17 on extension of the piston rod 16, wherein advantageously then the intermediate member 19 or also the intermediate joint 17 itself comes to rest in the recess 22, in particular on a front stop 22*a* of the recess 22. This terminates the first adjustment travel; on the subsequent extension movement of the piston rod 16, the second adjustment travel follows without interruption as the side air guide element 7 is then pivoted towards the outside.

In the first adjustment travel of the extension of the piston rod 16, in general the side air guide element 7 is not yet moved as long as the intermediate member 19 or intermediate joint 17 has not yet reached the stop 22*a*; in principle however, if there is greater resistance in the joints 17, 18 than the adjustment joint 20, a pivot movement of the side air guide element 7 towards the outside may take place; this is not relevant since a continuous adjustment movement occurs.

The recess 22 may be kept relatively small and, according to the diagrammatic depiction of FIG. 5, may be covered by flexible cover 23, e.g. a flexible hood or a flexible elastic tarpaulin which is preferably arranged on the outside of the air guide element 7 and e.g. is made from a flexible plastic material or rubber material. This prevents the formation of turbulence at the intermediate joint 17 with potential damage to the intermediate joint 17.

The collapse of the intermediate joint 17 increases the effective lever arm a, with which the piston rod 16 acts relative to the adjustment joint 20, from the value a1 in FIG. 2 to the value a2 in FIG. 3, wherein in particular it is also increased by the extended intermediate member 19, so that the torque exerted on the side air guide element 7 is increased. Thus the side air guide element 7 is extended further, wherein in the intermediate position of FIG. 3, a relatively large lever arm a2 is already present which is further increased to the value a3 on the subsequent pivoting of the side air guide element 7 towards the rear and laterally towards the outside.

Thus the travel position of FIG. 4 is reached, which is secured and locked by the pneumatic cylinder 14, for which e.g. a pneumatic valve control may be provided which closes the air volume stored in the pneumatic cylinder 14. Thus no additional catch is required.

In the subsequent return adjustment from the travel position, a continuous traction load is applied so that no critical intermediate situations may occur. In general, firstly the intermediate joint angle α at the intermediate joint 17 is reduced, i.e. the intermediate joint 17 is moved by the piston rod 16 towards the cylinder 14 until the value α0 of the base position has been reached, whereupon traction is applied on the spoiler-side joint 18 and hence the side air guide element 7 is moved into the retracted base position. Thus on the retraction process, in general, the second and first adjustment travels of the extension movement are not followed in the reverse order, but initially a low-load, third adjustment travel takes place until the intermediate joint 17 reaches the stop of the intermediate joint angle α0 in the base position, and then a fourth adjustment travel takes place in which the side air guide element 7 is pivoted until it reaches the base position of FIG. 2.

In both the extension process and the retraction process, the intermediate situations are not problematical.

The roof air guide element 8 may be adjusted in a corresponding fashion.

Thus the retraction movements and the extension movements may be performed independently and by automation, without further intervention by the user, e.g. by activation from the driver's cab or automatically depending on travel speed.

In the retracted base position, the rear doors 3 may be first completely swung to the rear and then towards the front through almost 270°, as shown by arc 3*z*, since in the embodiment shown in FIG. 2, the spoiler lies flat on the rear doors 3 and is held securely between the rear doors 3 and side element 7.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Lorry
2 Rear area
3 Rear door
4 Side face
5 Roof surface
6 Rear spoiler device
7 Side air guide element
7a Inside of side air guide element
7b Outside of roof air guide element
7c Front end of roof air guide element
8 Roof air guide element
9 Rear door hinge
10 Vehicle structure
12 Adjustment device
14 Pneumatic cylinder
15 Cylinder joint
15a Spacer, e.g. bearing block
16 Piston rod
17 Intermediate joint
18 Spoiler-side joint
19 Intermediate member
20 Adjustment joint
22 Recess
22a Front stop of recess 22
23 Flexible cover
α Intermediate joint angle at intermediate joint 17
α0 Intermediate joint angle in base position, α0<180°
a Effective lever length of adjustment device 12 at air guide element
βAngle between rear doors 3 and side air guide element 7, where
　β1 Contact angle
　β2 Travel position angle

The invention claimed is:

1. A rear spoiler device for a vehicle having at least one rear door, the rear spoiler device comprising:
an air guide element; and
an adjustment device configured to adjust the air guide element between a retracted base position that allows the rear door to be opened and an extended travel position configured to extend contours and guide air aerodynamically,
wherein the adjustment device is mounted in an articulated fashion on both a door-side joint and on a spoiler-side joint,
wherein the adjustment device has an intermediate joint provided between the door-side joint and the spoiler-side joint,
wherein an adjustment of the adjustment device from the base position to the travel position changes an intermediate joint angle formed at the intermediate joint, and
wherein on adjustment from the base position to the travel position, the adjustment device is configured for a first adjustment travel with collapse of the intermediate joint and enlargement of an effective lever arm relative to an adjustment joint of the air guide element, up to a contact on the air guide element, and a second adjustment travel with contact on the air guide element and with movement of the air guide element.

2. The rear spoiler device as claimed in claim 1, wherein the intermediate joint angle is formed as an angle between a connecting line from the intermediate joint to the door-side joint and a connecting line from the intermediate joint to the spoiler-side joint.

3. The rear spoiler device as claimed in claim 1, wherein in the base position, the intermediate joint lies outside a connecting line between the door-side joint and the spoiler-side joint, and/or the intermediate joint angle formed at the intermediate joint is not equal to 180°.

4. The rear spoiler device as claimed in claim 1, wherein the adjustment device has a length adjustment device for adjusting a distance between the intermediate joint on one side and either the door-side joint or the spoiler-side joint on the other side.

5. The rear spoiler device as claimed in claim 4, wherein the length adjustment device is actuated by an auxiliary force.

6. The rear spoiler device as claimed in claim 4, wherein the length adjustment device is provided between the intermediate joint and the door-side joint for adjusting a distance between the door-side joint and the intermediate joint, and a rigid intermediate member is provided between the intermediate joint and the spoiler-side joint.

7. The rear spoiler device as claimed in claim 4, wherein the adjustment between the base position and the travel position can be performed in a continuous adjustment movement by extending and retracting the length adjustment device.

8. The rear spoiler device as claimed in claim 1, wherein in the base position, a distance between the door-side joint and the spoiler-side joint is minimal and the intermediate joint angle has a maximal value, and in the travel position, the distance between the door-side joint and the spoiler-side joint is maximal and the intermediate joint angle has a minimal value.

9. The rear spoiler device as claimed in claim 1, wherein the door-side joint can be mounted spaced from the rear doors via a spacer.

10. The rear spoiler device as claimed in claim 1, wherein the spoiler-side joint is provided on the inside of the air guide element.

11. The rear spoiler device as claimed in claim 1, wherein the air guide element is a side air guide element which can be mounted via an adjustment joint on a lateral outer region of the rear doors or behind the rear doors.

12. The rear spoiler device as claimed in claim 1, wherein the air guide element is a roof air guide element.

13. A vehicle with a rear spoiler device as claimed in claim 1, wherein the rear spoiler device can be adjusted between the base position and the travel position by electric and/or pneumatic control during travel of the vehicle.

14. The vehicle as claimed in claim 13, wherein in the retracted base position of the rear spoiler device, the rear door can be opened and pivoted through 270 degrees to rest on a side face of the vehicle, wherein when retracted into its base position, the rear spoiler device may be received between the rear door and the side face.

15. The rear spoiler device as claimed in claim 5, wherein the auxiliary force is generated by a pneumatic adjustment with a pneumatic cylinder and an extendable piston rod or by an electric length adjustment.

16. The rear spoiler device as claimed in claim 9, wherein the spacer is a bearing block.

17. A rear spoiler device for a vehicle having at least one rear door, the rear spoiler device comprising:
- an air guide element; and
- an adjustment device configured to adjust the air guide element between a retracted base position that allows the rear door to be opened and an extended travel position configured to extend contours and guide air aerodynamically,
- wherein the adjustment device is mounted in an articulated fashion on both a door-side joint and on a spoiler-side joint,
- wherein the adjustment device has an intermediate joint provided between the door-side joint and the spoiler-side joint,
- wherein an adjustment of the adjustment device from the base position to the travel position changes an intermediate joint angle formed at the intermediate joint, and
- wherein the adjustment device has a length adjustment device for adjusting a distance between the intermediate joint on one side and either the door-side joint or the spoiler-side joint on the other side.

18. The rear spoiler device as claimed in claim 17, wherein the length adjustment device is provided between the intermediate joint and the door-side joint for adjusting a distance between the door-side joint and the intermediate joint, and a rigid intermediate member is provided between the intermediate joint and the spoiler-side joint.

19. The rear spoiler device as claimed in claim 17, wherein the adjustment between the base position and the travel position can be performed in a continuous adjustment movement by extending and retracting the length adjustment device.

20. A rear spoiler device for a vehicle having at least one rear door, the rear spoiler device comprising:
- an air guide element; and
- an adjustment device configured to adjust the air guide element between a retracted base position that allows the rear door to be opened and an extended travel position configured to extend contours and guide air aerodynamically,
- wherein the adjustment device is mounted in an articulated fashion on both a door-side joint and on a spoiler-side joint,
- wherein the adjustment device has an intermediate joint provided between the door-side joint and the spoiler-side joint,
- wherein an adjustment of the adjustment device from the base position to the travel position changes an intermediate joint angle formed at the intermediate joint, and
- wherein in the base position, a distance between the door-side joint and the spoiler-side joint is minimal and the intermediate joint angle has a maximal value, and in the travel position, the distance between the door-side joint and the spoiler-side joint is maximal and the intermediate joint angle has a minimal value.

* * * * *